United States Patent
Hong

(10) Patent No.: US 12,003,604 B2
(45) Date of Patent: Jun. 4, 2024

(54) MULTIMODAL DATA TRANSMISSION METHOD AND APPARATUS, AND MULTIMODAL DATA PROCESSING METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/013,900

(22) PCT Filed: Aug. 10, 2020

(86) PCT No.: PCT/CN2020/108287
§ 371 (c)(1),
(2) Date: Dec. 30, 2022

(87) PCT Pub. No.: WO2022/032458
PCT Pub. Date: Feb. 17, 2022

(65) Prior Publication Data
US 2023/0291811 A1    Sep. 14, 2023

(51) Int. Cl.
*H04L 67/60*    (2022.01)
*H04W 84/04*    (2009.01)

(52) U.S. Cl.
CPC .......... *H04L 67/60* (2022.05); *H04W 84/042* (2013.01)

(58) Field of Classification Search
CPC .............................. H04L 67/60; H04W 84/042
(Continued)

(56) References Cited

U.S. PATENT DOCUMENTS

2006/0034266 A1*  2/2006  Harris ............... H04N 7/147
                                                          370/356
2006/0052080 A1    3/2006  Vitikainen et al.
(Continued)

FOREIGN PATENT DOCUMENTS

CN    103167320 A    6/2013
CN    104410894 A    3/2015
(Continued)

OTHER PUBLICATIONS

ETSI, "ETSI TS 138 321 v15.3.0 Medium Access Control (MAC) protocol specification (3GPP TS 38.321 version 15.3.0 Release 15)", 2018, ETSI, www.etsi.org/deliver/etsi_ts/138300_138399/138321/15.03.00_60/ts_138321v150300p.pdf (Year: 2018).*
(Continued)

*Primary Examiner* — Ruolei Zong
(74) *Attorney, Agent, or Firm* — Arch & Lake LLP

(57) ABSTRACT

A terminal obtains at least one piece of data, in which each piece of data in the at least one piece of data belongs to a different modality; obtains acquisition time information corresponding to each piece of data; and sends the at least one piece of data and at least one acquisition time information to a centralized processing unit. The centralized processing unit receives at least one piece of data and at least one piece of acquisition time information from at least one terminal, determines data corresponding to each acquisition time information in the at least one acquisition time information from the at least one piece of data, and processes the data corresponding to each acquisition time information.

12 Claims, 6 Drawing Sheets obtaining at least one piece of data, in which each piece of data in the at least one piece of data belongs to a different modality — S101 obtaining acquisition time information corresponding to each piece of data — S102 sending the at least one piece of data and at least one acquisition time information to a centralized processing unit — S103

(58) Field of Classification Search
USPC .......................................................... 709/223
See application file for complete search history.

(56) References Cited

U.S. PATENT DOCUMENTS

| | | | | |
|---|---|---|---|---|
| 2011/0133910 | A1* | 6/2011 | Alarcon | G06F 3/016 |
| | | | | 340/407.1 |
| 2013/0038792 | A1* | 2/2013 | Quigley | A61H 19/32 |
| | | | | 348/E5.009 |
| 2013/0107786 | A1* | 5/2013 | Lotfallah | H04L 65/1083 |
| | | | | 370/312 |
| 2014/0118473 | A1* | 5/2014 | Halavy | H04N 7/152 |
| | | | | 348/14.09 |
| 2016/0313868 | A1 | 10/2016 | Weng et al. | |
| 2018/0348780 | A1 | 12/2018 | Zheng et al. | |
| 2019/0182534 | A1* | 6/2019 | Matsuoka | H04N 21/44 |

FOREIGN PATENT DOCUMENTS

| | | | | |
|---|---|---|---|---|
| CN | 104618786 A | * | 5/2015 | ......... H04N 21/4302 |
| CN | 107959821 A | * | 4/2018 | |
| CN | 107959821 A | | 4/2018 | |
| CN | 108496372 A | | 9/2018 | |
| CN | 109145168 A | | 1/2019 | |
| CN | 110062268 A | | 7/2019 | |
| CN | 110719436 A | | 1/2020 | |
| CN | 107137107 B | | 2/2020 | |
| CN | 111328136 A | * | 6/2020 | ......... H04W 72/005 |
| WO | 2015094891 A1 | | 6/2015 | |
| WO | 2020088739 A1 | | 5/2020 | |

OTHER PUBLICATIONS

Machine translation of CN-111328136-A (Year: 2020).*
International Search Report of PCT/CN2020/108287 dated May 11, 2021, with English translation, (4p).
CNOA for Application No. 202080001793.2 dated Feb. 1, 2024 with English translation, (10p).
European Search Report for Application No. 20948957.4 dated Mar. 22, 2024, (8p).

* cited by examiner

MULTIMODAL DATA TRANSMISSION METHOD AND APPARATUS, AND MULTIMODAL DATA PROCESSING METHOD AND APPARATUS

CROSS-REFERENCE TO RELATED APPLICATION

This application is the US national phase application of International Application No. PCT/CN2020/108287, filed on Aug. 10, 2020, the entire contents of which are incorporated herein by reference for all purposes.

TECHNICAL FIELD

The disclosure relates to the field of communication technologies, and provides a multimodal data transmission method, a multimodal data transmission apparatus, a multimodal data processing method, a multimodal data processing apparatus, an electronic device and a computer-readable storage medium.

BACKGROUND

With the official commercialization of 5G technology, the research of 6G technology is put on the agenda. Smart interaction is a possible important application scenario of the 6G technology. The smart interaction refers to an intelligent interaction generated between intelligent entities (including humans and objects). Most of the existing interactions between the intelligent entities are passive and depend on input requirements, such as voice or visual interaction between the user and the smart household equipment, in which the smart household equipment passively receives the data input by the user and the input data are unimodal.

In the 6G era, multimodality will become a norm, in which inputs from multiple devices or multiple inputs from one device are sent to a centralized processing unit for integrated processing, so that one or more outputs satisfying the user's needs can be obtained, and the multiple outputs may also be output by multiple devices or one device.

SUMMARY

According to a first aspect of the disclosure, a multimodal data transmission method, performed by at least one terminal, is provided. The method includes:
  obtaining at least one piece of data, in which each piece of data in the at least one piece of data belongs to a different modality;
  determining acquisition time information corresponding to obtaining each piece of data; and
  sending the at least one piece of data and at least one acquisition time information to a centralized processing unit.

According to a second aspect of the disclosure, a multimodal data processing method, performed by a centralized processing unit, is provided. The method includes:
  receiving at least one piece of data and at least one acquisition time information from at least one terminal;
  determining data corresponding to each acquisition time information in the at least one acquisition time information from the at least one piece of data; and
  processing the data corresponding to the acquisition time information.

According to a third aspect of the disclosure, an electronic device is provided. The electronic device includes:
  a processor;
  a memory for storing instructions executable by the processor; in which
  the processor is configured to implement the multimodal data transmission method of any one of the above embodiments and/or the multimodal data processing method of any one of the above embodiments.

BRIEF DESCRIPTION OF THE DRAWINGS

In order to clearly illustrate the technical solution of the embodiments of the disclosure, a brief description of drawings used in the embodiments is given below. Obviously, the drawings in the following descriptions are only part of the embodiments of the disclosure, and for those skilled in the art, other drawings can be obtained according to these drawings without inventive works.

DETAILED DESCRIPTION

Reference will be made clearly and completely in the technical solution of the embodiments of the disclosure with the accompanying drawings. Obviously, the embodiments described here are only part of the embodiments of the disclosure and are not all embodiments of the disclosure. Based on the embodiments of the disclosure, other embodiments obtained by those skilled in the art without inventive works are within the scope of the disclosure.

Figure 1:
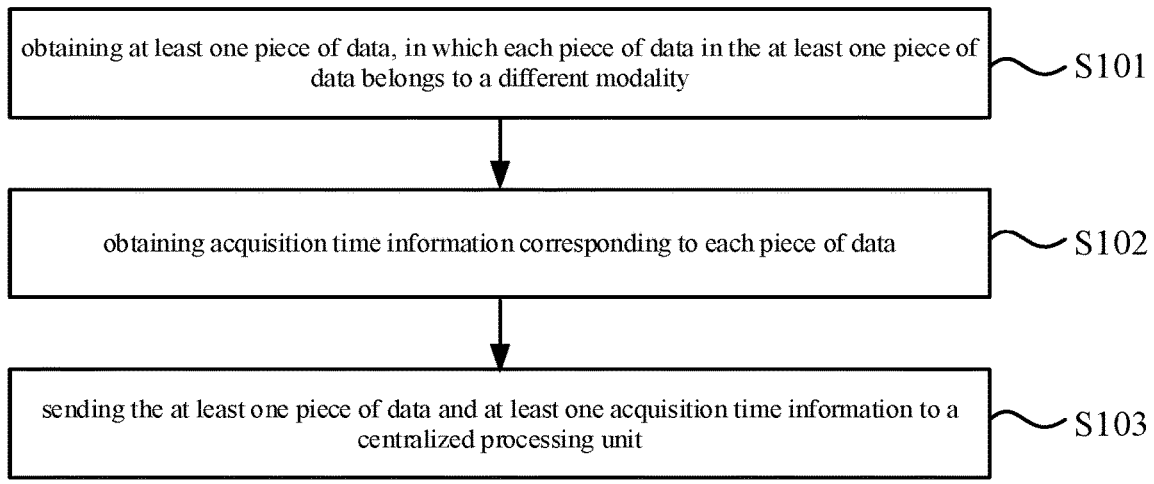
FIG. 1 is a flowchart of a multimodal data transmission method according to the embodiment of the disclosure.

FIG. 1 is a flowchart of a multimodal data transmission method according to the embodiment of the disclosure. The method shown in this embodiment may be applied in at least one terminal, which includes but is not limited to a cell phone, a tablet computer, a wearable device, a sensor, an Internet of Things (IoT) device, and other electronic devices.

The terminal may communicate with a base station as a user equipment. The base station may be a 5G base station, a 6G base station or a base station for a communication system of any generation. The base station may communicate with the core network, and the core network may communicate with the server in the network. For example, the core network may communicate with the server based on an Application Programming Interface (API).

As shown in FIG. 1, the method further includes the following steps.

At step S101, at least one piece of data is obtained, in which each piece of data in the at least one piece of data belongs to a different modality.

It is noted that if the at least one piece of data refers to one piece of data, the at least one piece of data may be obtained by one terminal. If the at least one piece of data refers to multiple pieces of data, the at least one piece of data may be obtained by one terminal or multiple terminals. For example, different terminals may be used to obtain data of different modalities.

At step S102, acquisition time information corresponding to obtaining each piece of data is determined.

At step S103, the at least one piece of data and at least one acquisition time information are sent to a centralized processing unit.

In an embodiment, for the at least one piece of data acquired by the terminal, each piece of data may belong to a different modality. For example, the multimodal data includes audio modal data and video modal data. After the multimodal data is sent to the centralized processing unit, the centralized processing unit processes the multimodal data. For example, according to the above-mentioned audio modal data and video modal data, real-time translation can be performed, with the audio modal data being the user's voice and the video modal data being the movements of the user's mouth, and the words spoken by the user may be obtained as a translation output result according to the audio modal data and the video modal data.

In the related art, since the data transmitted between the intelligent entities are unimodal, after the data is received, the data is processed directly according to a fixed modal processing mode, and there is no need to consider the acquisition time information of the data. Since the data transmitted between the intelligent entities are multimodal in the 6G technology, if the processing is carried out according to the way in the related art, the centralized processing unit may not determine the acquisition time information of the data, and thus problems may occur in the processing process and an accurate translation result may not be output. For example, for the above audio modal data and the video modal data, the audio modal data acquired at T1 and the video modal data acquired at T2 may be processed as the data acquired at the same time point, in which T1 is not equal to T2.

According to the embodiment of the disclosure, the acquisition time information corresponding to the modality to which each piece of data belongs is determined. For example, for audio modal data A and video modal data B, the audio modal data A and the video modal data B may be acquired at T0, and it is determined that the acquisition time information of obtaining the audio modal data A is T0 and the acquisition time information of obtaining the video modal data B is T0.

The audio modal data A, the video modal data B, the acquisition time information T0 of the audio modal data A and the acquisition time information T0 of the video modal data B are sent to the centralized processing unit, and the centralized processing unit may determine the audio modal data A and the video modal data B corresponding to the acquisition time information T0 needing to be processed at the same time as inputs of the same processing process. Therefore, the centralized processing unit may determine the data of each modality acquired at the same time or in the same time period based on the acquisition time information, so that the data of each modality acquired at the same time or in the same time period may be processed as the inputs of the same processing process, to obtain the accurate processing result.

For example, for the above audio modal data A and the video modal data B, in addition to the audio modal data A and the video modal data B, the acquisition time information T0 of the audio modal data A and the acquisition time information T0 of the video modal data B are also sent to the centralized processing unit. The centralized processing unit may receive multiple pieces of audio modal data and multiple pieces of video modal data, and the acquisition time information corresponding to each piece of audio modal data and the acquisition time information corresponding to each piece of video modal data. For example, two pieces of audio modal data A1, A2 and two pieces of video modal data B1 and B2 are received, and the acquisition time information corresponding to A1 and B1 is T1 and the acquisition time information corresponding to A2 and B2 is T2, the centralized processing unit may determine A1 and B1 corresponding to T1 as inputs of one processing process and determine A2 and B2 corresponding to T2 as inputs of another processing process, to ensure the accuracy of the processing results.

In an embodiment, the centralized processing unit may be a physical device or a function integrated on a physical device. The physical device may be a base station, a core network (a core network device), or a server, such as a Mobile Edge Computing (MEC) server. The respective exemplary descriptions when the centralized processing unit is installed in a base station, a core network, and a server are described below.

Optionally, the acquisition time information is represented by at least one of:
 an absolute time, a relative time, or a system frame number.

In an embodiment, the acquisition time information may be represented by an absolute time, such as GMT+8. Alternatively, the acquisition time information may be represented by a relative time. For example, the centralized processing unit and the terminal may pre-store a reference time, after determining the acquisition time information, the terminal may calculate an offset time of the acquisition time information relative to the reference time and send the offset time as the relative time to the centralized processing unit. Alternatively, the acquisition time information may be represented by a System Frame Number (SFN). For example, the terminal may determine the SFN when obtaining the data during the communication process with the base station and determine the SFN as the acquisition time information of the data.

Optionally, the acquisition time information is carried in at least one of:
 a MAC subheader, a MAC protocol data unit, or a MAC control element.

In an embodiment, the terminal may send the acquisition time information to the centralized processing unit via an uplink shared channel (UL-SCH). For example, the acquisition time information may be carried in the MAC subheader, the MAC protocol data unit, or the MAC Control Element (MAC CE).

Optionally, the acquisition time information is carried in the MAC subheader, and the acquisition time information is indicated by a logical channel identifier and/or an enhanced logical channel identifier of the MAC subheader.

Figure 2:
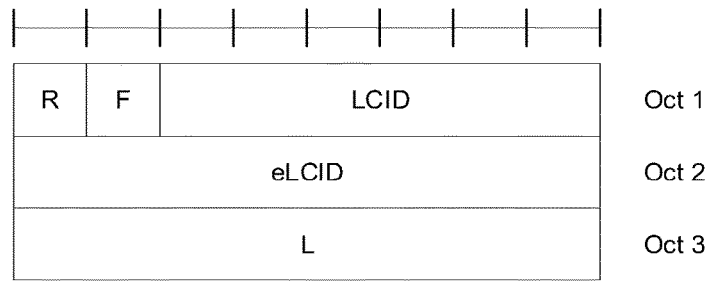
FIG. 2 is a schematic diagram of a Media Access Control (MAC) subheader according to the embodiment of the disclosure.

Optionally, for the acquisition time information carried in the MAC subheader, the acquisition time information may be indicated by the logical channel identifier of the MAC subheader or the enhanced logical channel identifier. The structure of the MAC subheader is shown in FIG. 2, in which LCID represents the logical channel identifier and eLCID represents the enhanced logical channel identifier. The acquisition time information may be indicated by LCID or eLCID.

Since there are many reserved bits in the LCID, for example, index 64 to index 319 of the eLCIDs are reserved, and no corresponding meanings are set for theses reserved bits in the related art. Therefore, the embodiment uses the eLCID to indicate the acquisition time information, and the existing reserved bits in the MAC subheader can be used without adding additional bits to the MAC subheader, so that there is no need to change the MAC subheader.

It should be noted that the MAC subheader, the MAC protocol data unit and the MAC CE are only optional carriers for the acquisition time information in this disclosure. The optional carriers for the acquisition time information may be selected according to the needs in practical applications, which are not limited to the above-mentioned cases. For example, a Scheduling Request (SR) may be used to carry the acquisition time information.

Optionally, the at least one piece of data and the at least one acquisition time information are sent during the same transmission or during different transmissions.

In an embodiment, the terminal may send the at least one piece of data and the at least one acquisition time information during the same transmission or during different transmissions.

For example, the terminal may send an SR to the base station via a physical uplink control channel to request resources, in which at least one piece of the acquisition time information is set in the SR, and then the terminal sends the MAC Protocol Data Unit (PDU) by the requested resources, in which at least one piece of data may be set in the MAC PDU. For example, the terminal may also send the at least one piece of data and the at least one acquisition time information in the MAC PDU at one time.

In an embodiment, if the data and the corresponding acquisition time information are sent to the centralized processing unit during the same transmission, an association relation between the time information and the data may not be carried, and the centralized processing unit assumes that the acquisition time information is associated with the data received during the same reception process by default. If the data and the corresponding acquisition time information are sent to the centralized processing unit during different transmissions, the association relation between the time information and the data may be carried, so that the centralized processing unit may determine the data associated with the acquisition time information.

Figure 3:
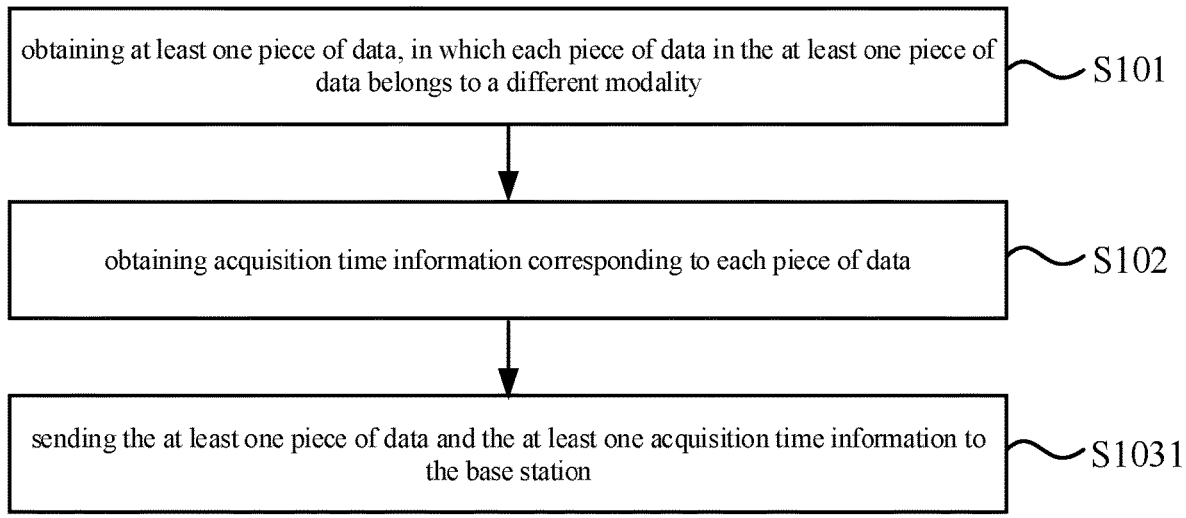
FIG. 3 is a flowchart of a multimodal data transmission method according to the embodiment of the disclosure.

FIG. 3 is a flowchart of a multimodal data transmission method according to the embodiment of the disclosure. As shown in FIG. 3, the centralized processing unit is configured at a base station, and sending the at least one piece of data and the at least one acquisition time information to the centralized processing unit includes the following steps.

At step S1031, the at least one piece of data and the at least one acquisition time information are sent to the base station.

In an embodiment, if the centralized processing unit is configured at the base station, the terminal may send the at least one piece of data and the at least one acquisition time information to the base station directly.

Figure 4:
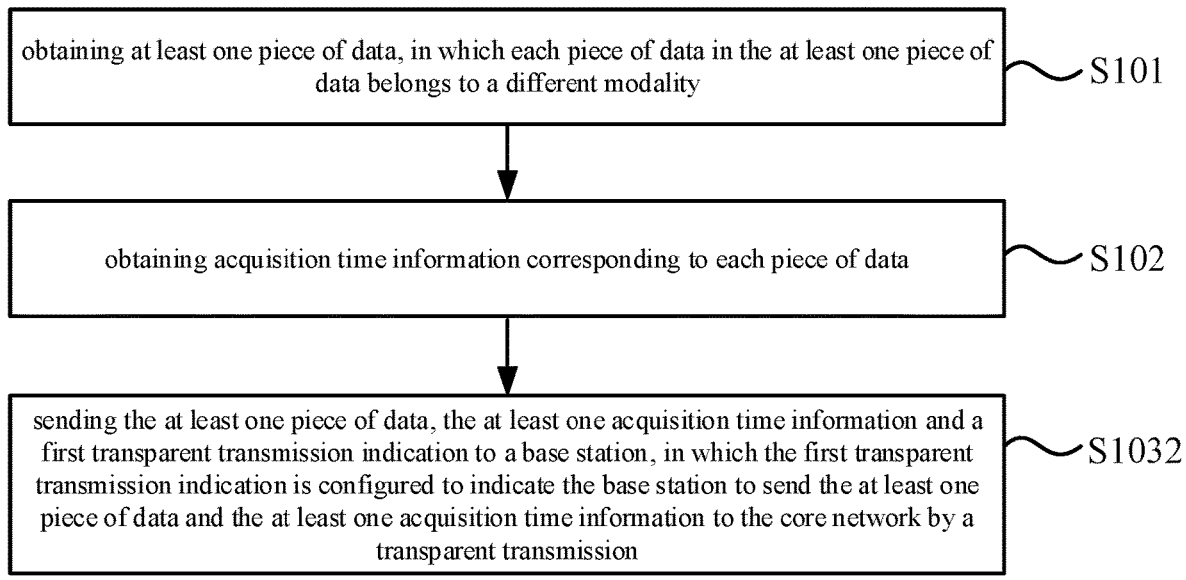
FIG. 4 is a flowchart of a multimodal data transmission method according to the embodiment of the disclosure.

FIG. 4 is a flowchart of a multimodal data transmission method according to the embodiment of the disclosure. As shown in FIG. 4, the centralized processing unit is configured at a core network, and sending the at least one piece of data and the at least one acquisition time information to the centralized processing unit includes the following steps.

At step S1032, the at least one piece of data, the at least one acquisition time information and a first transparent transmission indication are sent to a base station, in which the first transparent transmission indication is configured to indicate the base station to send the at least one piece of data and the at least one acquisition time information to the core network by a transparent transmission.

In an embodiment, if the centralized processing unit is configured at the core network, when the terminal sends the at least one piece of data and the at least one acquisition time information to the core network, the base station is needed. In addition to the at least one piece of data and the at least one acquisition time information, the terminal may send the first transparent transmission indication to the base station, which is configured to indicate the base station to send the at least one piece of data and the at least one acquisition time information to the core network by a transparent transmission. In the above implementation, the data is not processed by the base station.

Figure 5:
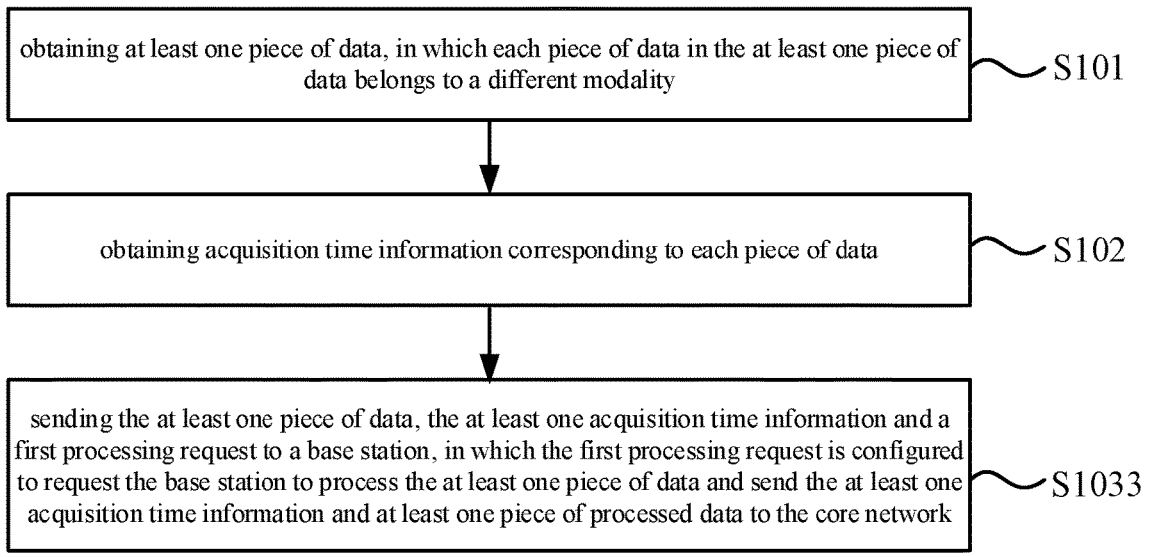
FIG. 5 is a flowchart of a multimodal data transmission method according to the embodiment of the disclosure.

FIG. 5 is a flowchart of a multimodal data transmission method according to the embodiment of the disclosure. As shown in FIG. 5, the centralized processing unit is configured at a core network, and sending the at least one piece of data and the at least one acquisition time information to the centralized processing unit includes the following steps.

At step S1033, the at least one piece of data, the at least one acquisition time information and a first processing request are sent to a base station, in which the first processing request is configured to request the base station to process the at least one piece of data and send the at least one acquisition time information and at least one piece of processed data to the core network.

In an embodiment, if the centralized processing unit is configured at the core network, when the terminal sends the at least one piece of data and the at least one acquisition time information to the core network, the base station is needed. In addition to the at least one piece of data and the at least one acquisition time information, the terminal may send the first processing request to the base station, which is configured to request the base station to process the at least one piece of data and send the at least one acquisition time information and at least one piece of processed data to the core network.

It should be noted that in the embodiment and the following embodiments, the way the base station processes the at least one piece of data may vary depending on the processing requests. Alternatively, the way the base station processes the at least one piece of data is determined by itself. For example, the base station determines the modality to which each piece of data belongs based on the at least one acquisition time information, and determines a Quality of Service (QoS) of the data during the transmission process based on the modality.

Optionally, the centralized processing unit is configured at a core network, and sending the at least one piece of data and the at least one acquisition time information to the centralized processing unit includes:

sending the at least one piece of data and the at least one acquisition time information to a base station, in which the at least one piece of data and the at least one acquisition time information are included in first preset information, and the base station processes contents of the first preset information based on the at least one piece of data and the at least one acquisition time information included in the first preset information, and sends processed first preset information to the core network; or sending the at least one piece of data and the at least one acquisition time information to a base station, in which the at least one piece of data and the at least one acquisition time information are included in second preset information, and the base station transparently transmits the second preset information to the core network based on the at least one piece of data and the at least one acquisition time information included in the second preset information.

In the embodiment, the base station may explicitly decide whether to transparently transmit the data or process data based on a transmission indication or transmission request sent by the terminal in the above embodiment, and the base station may implicitly decide whether to transparently transmit the data or process the data.

For example, the base station processes the contents of the first preset information by default, and then when the terminal sets the at least one piece of data and the at least one acquisition time information in the first preset information and sends the first preset information to the base station, the base station processes the at least one piece of data in the first preset information by default. The first preset information may be an RRCSetupComplete signaling.

For example, if the base station transparently transmits the second preset information to the core network by default, and then when the terminal sets the at least one piece of data and the at least one acquisition time information in the second preset information and sends the second preset information to the base station, the base station transparently transmits the at least one piece of data included in the second preset information to the core network by default. The second preset information may be a dedicated NAS-Message.

It is noted that the terminal may determine whether the base station is needed to process the at least one piece of data. If the base station is needed to process the data, the terminal sets the at least one piece of data and the at least one acquisition time information in the first preset information and sends the first preset information to the base station. If the base station is not needed to process the data, the terminal sets the at least one piece of data and the at least one acquisition time information in the second preset information and sends the second preset information to the base station.

Figure 6:
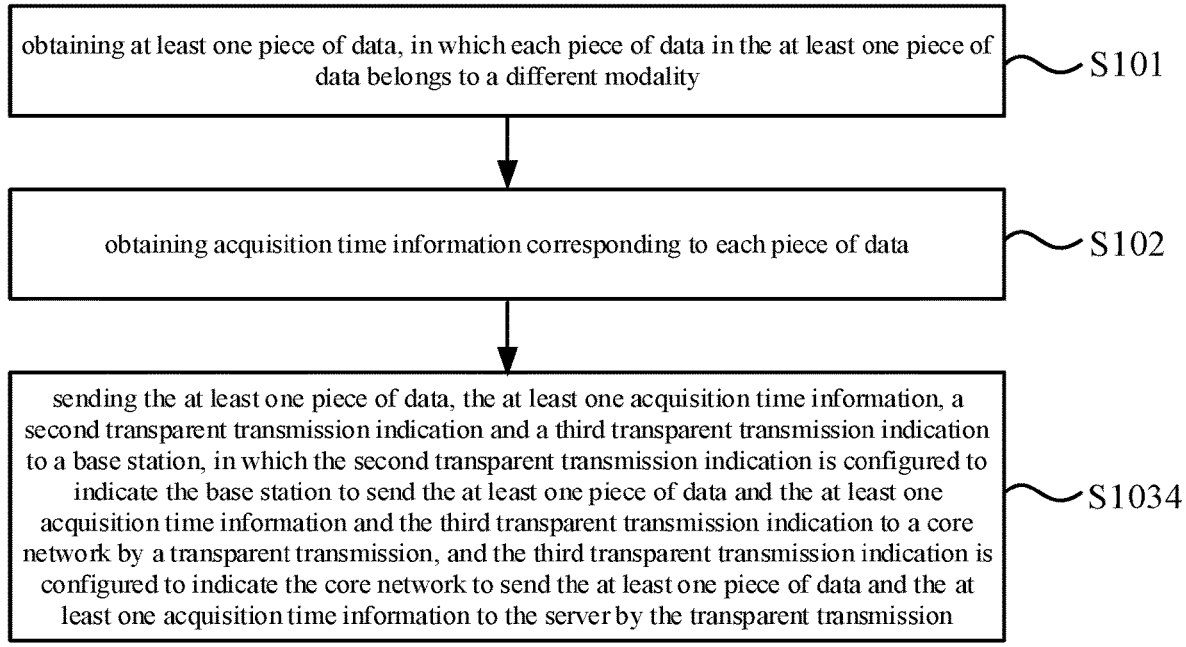
FIG. 6 is a flowchart of a multimodal data transmission method according to the embodiment of the disclosure.

FIG. 6 is a flowchart of a multimodal data transmission method according to the embodiment of the disclosure. As shown in FIG. 6, the centralized processing unit is configured at a server, and sending the at least one piece of data and the at least one acquisition time information to the centralized processing unit includes the following steps.

At step S1034, the at least one piece of data, the at least one acquisition time information, a second transparent transmission indication and a third transparent transmission indication are sent to a base station, in which the second transparent transmission indication is configured to indicate the base station to send the at least one piece of data and the at least one acquisition time information and the third transparent transmission indication to a core network by a transparent transmission, and the third transparent transmission indication is configured to indicate the core network to send the at least one piece of data and the at least one acquisition time information to the server by the transparent transmission.

In an embodiment, when the centralized processing unit is set at a server, when the terminal sends the at least one piece of data and the at least one acquisition time information to the core network, the base station and the core network are involved.

When the terminal sends the at least one piece of data and the at least one acquisition time information to the base station, the terminal may also send the second transparent transmission indication and the third transparent transmission indication, in which the second transparent transmission indication is configured to indicate the base station to send the at least one piece of data, the at least one acquisition time information and the third transparent transmission indication by the transparent transmission to the core network.

The third transparent transmission indication is configured to indicate the core network to send the at least one piece of data and the at least one acquisition time information to the server by the transparent transmission, and the base station and the core network will not process the data.

Figure 7:
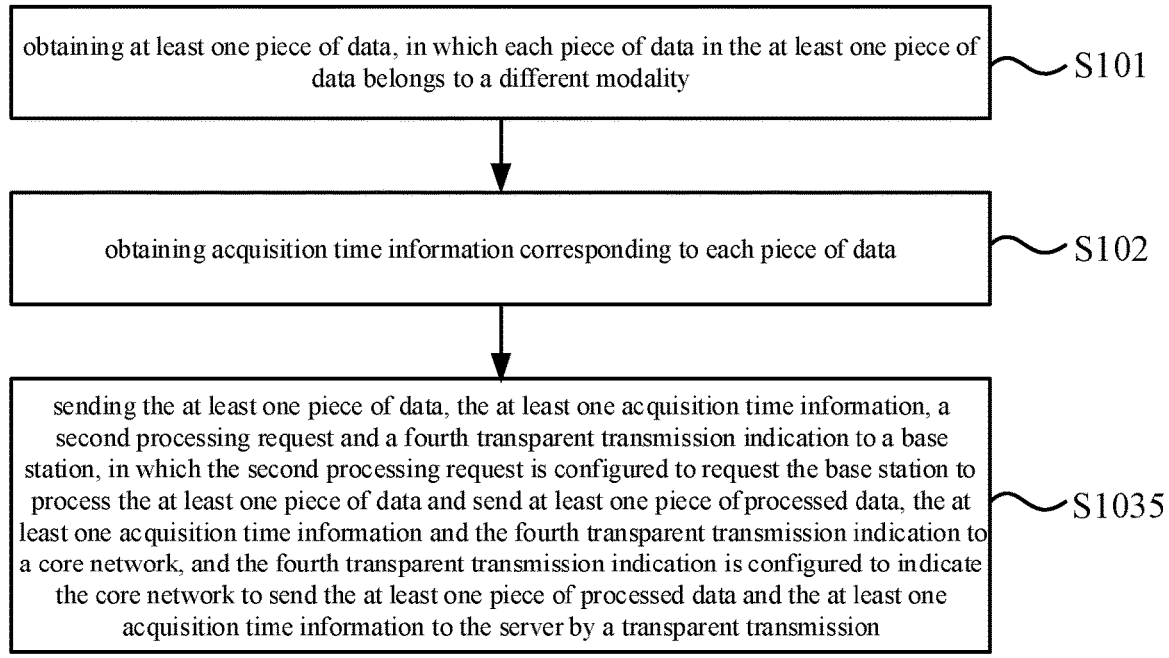
FIG. 7 is a flowchart of a multimodal data transmission method according to the embodiment of the disclosure.

FIG. 7 is a flowchart of a multimodal data transmission method according to the embodiment of the disclosure. As shown in FIG. 7, the centralized processing unit is configured at a server, and sending the at least one piece of data and the at least one acquisition time information to the centralized processing unit includes the following steps.

At step S1035, the at least one piece of data, the at least one acquisition time information, a second processing request and a fourth transparent transmission indication are sent to a base station, in which the second processing request is configured to request the base station to process the at least one piece of data and send at least one piece of processed data, the at least one acquisition time information and the fourth transparent transmission indication to a core network, and the fourth transparent transmission indication is configured to indicate the core network to send at least one piece of processed data and the at least one acquisition time information to the server by a transparent transmission.

In an embodiment, when the centralized processing unit is set at a server, and when the terminal sends the at least one piece of data and the at least one acquisition time information to the core network, the base station and the core network are involved.

When the terminal sends the at least one piece of data and the at least one acquisition time information to the base station, the terminal may also send the second processing request and the fourth transparent transmission indication, in which the second processing request is configured to request the base station to process the at least one piece of data and send at least one piece of processed data, the at least one acquisition time information and the fourth transparent transmission indication to a core network.

The fourth transparent transmission indication is configured to indicate the core network to send at least one piece of processed data and the at least one acquisition time information to the server by the transparent transmission, in which the base station is required to process the data, and the core network will not process the data.

Figure 8:
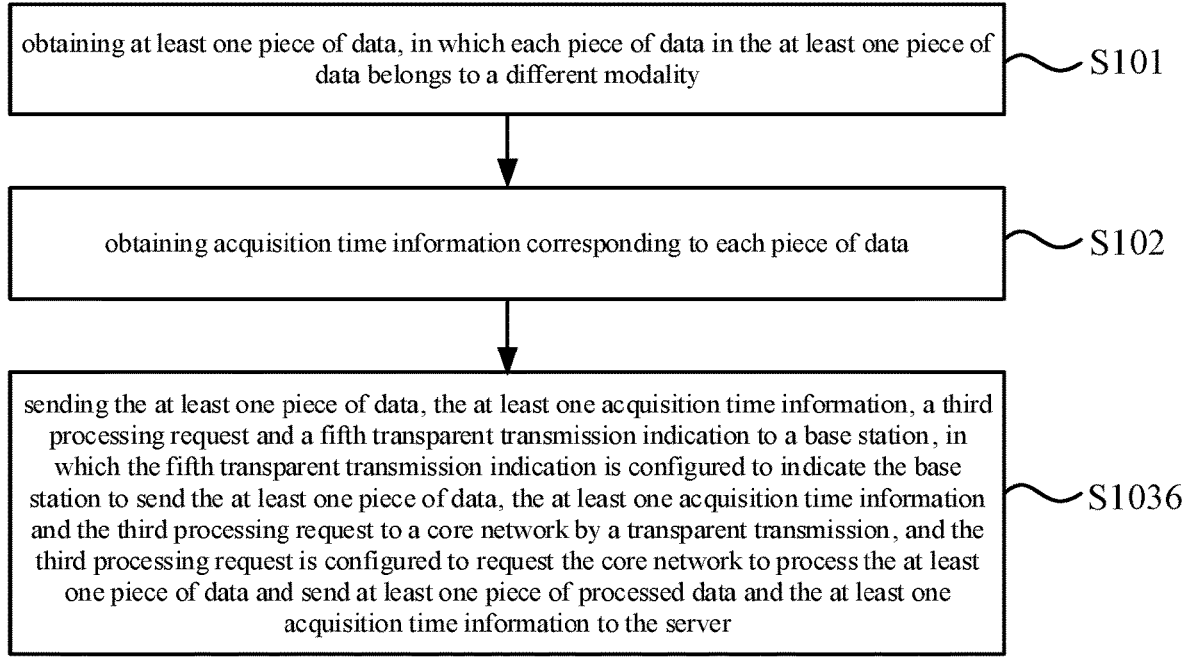
FIG. 8 is a flowchart of a multimodal data transmission method according to the embodiment of the disclosure.

FIG. 8 is a flowchart of a multimodal data transmission method according to the embodiment of the disclosure. As shown in FIG. 8, the centralized processing unit is configured at a server, and sending the at least one piece of data and the at least one acquisition time information to the centralized processing unit includes the following steps.

At step S1036, the at least one piece of data, the at least one acquisition time information, a third processing request and a fifth transparent transmission indication are sent to a base station, in which the fifth transparent transmission indication is configured to indicate the base station to send the at least one piece of data, the at least one acquisition time information and the third processing request to a core network by a transparent transmission, and the third processing request is configured to request the core network to process the at least one piece of data and send at least one piece of processed data and the at least one acquisition time information to the server.

In an embodiment, when the centralized processing unit is set at a server and when the terminal send the at least one piece of data and the at least one acquisition time information to the core network, the base station and the core network are involved.

When the terminal sends the at least one piece of data and the at least one acquisition time information to the base station, the terminal may also send the third processing request and the fifth transparent transmission indication, in which the fifth transparent transmission indication is configured to indicate the base station to send the at least one piece of data, the at least one acquisition time information and the third processing request to a core network by a transparent transmission.

The third processing request is configured to request the core network to process the at least one piece of data and send at least one piece of processed data and the at least one acquisition time information to the server, in which the base station will not process the data, and the core network is required to process the data.

It should be noted that in the embodiment and the following embodiments, the way the core network processes the at least one piece of data may vary depending on the processing requests. Alternatively, the way the core network processes the at least one piece of data is determined by itself. For example, the core network determines the modality to which each piece of data belongs based on the at least one acquisition time information, and determines a QoS of the data during the transmission process based on the modality. Certainly, the way in which the core network processes the data may be different from the way in which the base station processes the data, and the difference is not limited to the QoS.

Figure 9:
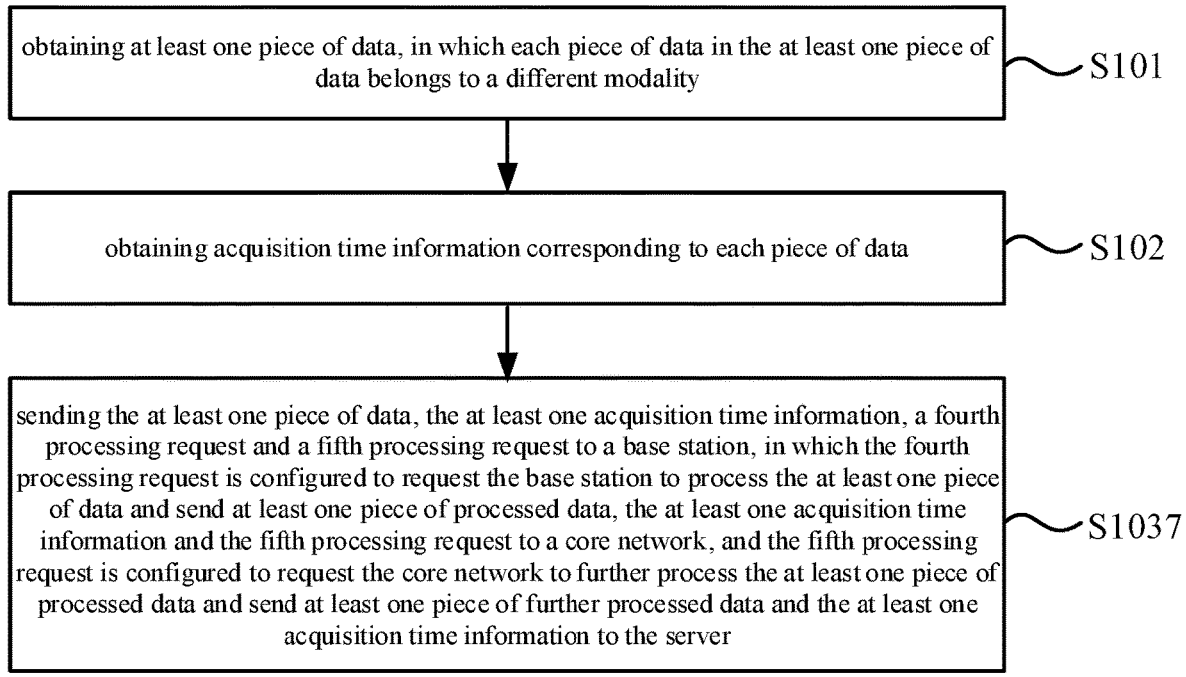
FIG. 9 is a flowchart of a multimodal data transmission method according to the embodiment of the disclosure.

FIG. 9 is a flowchart of a multimodal data transmission method according to the embodiment of the disclosure. As shown in FIG. 9, the centralized processing unit is configured at a server, and sending the at least one piece of data and the at least one acquisition time information to the centralized processing unit includes the following steps.

At step S1037, the at least one piece of data, the at least one acquisition time information, a fourth processing request and a fifth processing request are sent to a base station, in which the fourth processing request is configured to request the base station to process the at least one piece of data and send at least one piece of processed data, the at least one acquisition time information and the fifth processing request to a core network, and the fifth processing request is configured to request the core network to further process the at least one piece of processed data and send at least one piece of further processed data and the at least one acquisition time information to the server.

In an embodiment, when the centralized processing unit is set at a server, and when the terminal sends the at least one piece of data and the at least one acquisition time information to the core network, the base station and the core network are involved.

When the terminal sends the at least one piece of data and the at least one acquisition time information to the base station, the terminal may also send the fourth processing request and the fifth processing request, in which the fourth processing request is configured to request the base station to process the at least one piece of data and send at least one piece of processed data, the at least one acquisition time information and the fifth processing request to a core network.

The fifth processing request is configured to request the core network to further process the at least one piece of processed data and send at least one piece of further processed data and the at least one acquisition time information to the server. The base station and the core network process the data respectively.

Optionally, the centralized processing unit is configured at a server, and sending the at least one piece of data and the at least one acquisition time information to the centralized processing unit includes:

sending the at least one piece of data and the at least one acquisition time information to a base station, in which the at least one piece of data and the at least one acquisition time information are included in third preset information, the base station transparently transmits second preset information to a core network based on the at least one piece of data and the at least one acquisition time information included in the third preset information, and the core network transparently transmits the second preset information to the server based on the at least one piece of data and the at least one acquisition time information included in the third preset information; or sending the at least one piece of data and the at least one acquisition time information to a base station, in which the at least one piece of data and the at least one acquisition time information are included in fourth preset information, the base station transparently transmits the fourth preset information to a core network based on the at least one piece of data and the at least one acquisition time information included in the fourth preset information, and the core network processes contents of the fourth preset information based on the at least one piece of data and the at least one acquisition time information included in the fourth preset information, and sends processed fourth preset information to the server; or sending the at least one piece of data and the at least one acquisition time information to a base station, in which the at least one piece of data and the at least one acquisition time information are included in fifth preset information, the base station processes contents of the fifth preset information based on the at least one piece of data and the at least one acquisition time information included in the fifth preset information and sends processed fifth preset information to a core network, and the core network transparently transmits the processed fifth preset information to the server based on the at least one piece of data and the at least one acquisition time information included in the fifth preset information; or sending the at least one piece of data and the at least one acquisition time information to a base station, in which the at least one piece of data and the at least one acquisition time information are included in sixth preset information, the base station processes contents of the sixth preset information based on the at least one piece of data and the at least one acquisition time information included in the sixth preset information and sends processed sixth preset information to a core network, and the core network may further process the sixth preset information based on the at least one piece of data and the at least one acquisition time information included in the sixth preset information and send further processed sixth preset information to the server.

In the embodiment, the base station and the core network may explicitly decide whether to transparently transmit the data or process data based on a transmission indication or transmission request sent by the terminal in the above embodiment, and the base station and the core network may implicitly decide whether to transparently transmit the data or process data.

For example, if the base station and the server transparently transmit the contents of the third preset information by default, when the terminal sends the at least one piece of data and the at least one acquisition time information included in the third preset information to the base station, the base station transparently transmits the at least one piece of data and the at least one acquisition time information included in the third preset information to the core network by default, and then the core network transparently transmits the at least one piece of data and the at least one acquisition time information included in the third preset information to the server by default.

For example, if the base station transparently transmits the fourth preset information by default and the core network processes the contents of the fourth preset information by default, when the terminal sends the at least one piece of data and the at least one acquisition time information included in the fourth preset information to the base station, the base station transparently transmits the at least one piece of data and the at least one acquisition time information included in the fourth preset information to the core network by default, and then the core network processes the at least one piece of data included in the fourth preset information by default.

For example, if the base station processes the contents of the fifth preset information by default and the core network sends the fifth preset information by the transparent transmission by default, and then when the terminal sends the at least one piece of data and the at least one acquisition time information included in the fifth preset information to the base station, the base station processes the at least one piece of data included in the fifth preset information by default and sends processed fifth preset information to the core network, and the core network transparently transmits the processed fourth preset information to the server by default.

For example, if the base station and the core network process the sixth preset information by default, when the terminal sends the at least one piece of data and the at least one acquisition time information included in the sixth preset information to the base station, the base station processes the at least one piece of data included in the sixth preset information by default and sends processed sixth preset information to the core network, and the core network may further process the at least one piece of data included in the sixth preset information by default and send further processed sixth preset information to the server.

It is noted that the terminal may determine whether the base station and the core network are needed to process the at least one piece of data, and further determine the preset information on which the at least one piece of data is set. For example, when the base station and the server are needed to transparently transmit the at least one piece of data, the at least one piece of data and the at least one acquisition time information may be set in the third preset information to be sent to the base station. For example, when the base station and the server are needed to process the at least one piece of data, the at least one piece of data and the at least one acquisition time information may be set in the sixth preset information to be sent to the base station.

Figure 10:
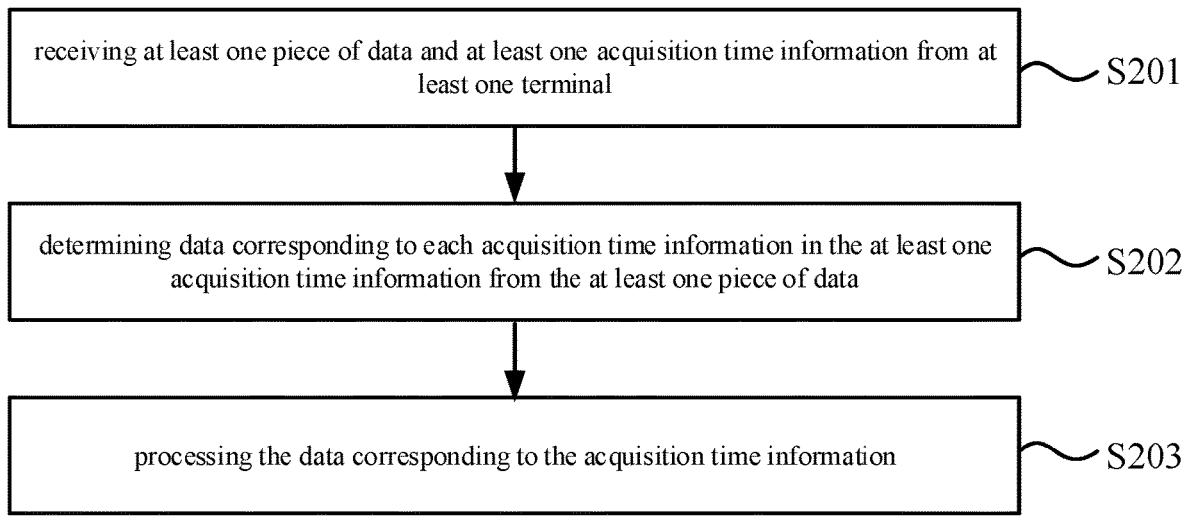
FIG. 10 is a flowchart of a multimodal data processing method according to the embodiment of the disclosure.

FIG. 10 is a flowchart of a multimodal data processing method according to the embodiment of the disclosure. The method shown in this embodiment is applied in a centralized processing unit, and the centralized processing unit may be a physical device or a function integrated on a physical device. The physical device shown may be a base station, a core network, or a server.

As shown in FIG. 10, the method includes the following steps.

At step S201, at least one piece of data and at least one acquisition time information are received from at least one terminal.

At step S202, data corresponding to each acquisition time information in the at least one acquisition time information is determined from the at least one piece of data.

At step S203, the data corresponding to the acquisition time information is processed.

In an embodiment, the centralized processing unit may receive the at least one piece of data and the at least one acquisition time information sent by the terminal. It should be noted that the at least one piece of data and the at least one acquisition time information may be sent directly by the terminal to the centralized processing unit. For example, if the centralized processing unit is configured at the base station, the at least one piece of data and the at least one acquisition time information may be sent directly by the terminal to the base station, or the at least one piece of data and the at least one acquisition time information may be sent indirectly by the terminal to the centralized processing unit. For example, the centralized processing unit may be set in the core network or the server, and if the centralized processing unit is set in the core network, the at least one piece of data and the at least one acquisition time information may be sent by the terminal to the base station, and then the base station forwards the at least one piece of data and the at least one acquisition time information to the core network.

Since the centralized processing unit receives not only the at least one piece of data but also the acquisition time information corresponding to the modality of each piece of data, the centralized processing unit can determine the data acquired at the same time based on the acquisition time information, so that the data acquired at the same time can be processed as the inputs of the same processing process, to obtain the accurate processing result.

Optionally, the centralized processing unit is set in at least one of:

a base station, a core network, or a server.

Optionally, the server is a MEC server.

Corresponding to the aforementioned embodiments of the multimodal data transmission method and the multimodal data processing method, the disclosure also provides the embodiments of the multimodal data transmission apparatus and the multimodal data processing apparatus.

Figure 11:
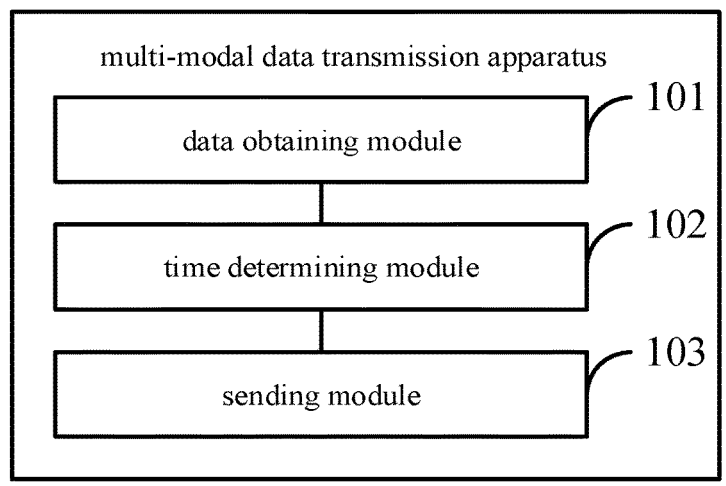
FIG. 11 is a schematic diagram of a multimodal data transmission apparatus according to the embodiment of the disclosure.

FIG. 11 is a schematic diagram of a multimodal data transmission apparatus according to the embodiment of the disclosure. The apparatus shown in this embodiment may be applied in at least one terminal, which includes but is not limited to a cell phone, a tablet computer, a wearable device, a sensor, an IoT device, and other electronic devices.

The terminal may communicate with a base station as a user equipment. The base station may be a 5G base station, a 6G base station or a base station for a communication system of any generation. The base station may communicate with the core network, and the core network may communicate with the server in the network. For example, the core network may communicate with the server based on the API.

As shown in FIG. 11, the apparatus includes: a data obtaining module 101, a time determining module 102 and a sending module 103.

The data obtaining module 101 is configured to obtain at least one piece of data, in which each piece of data in the at least one piece of data belongs to a different modality.

The time determining module 102 is configured to determine acquisition time information corresponding to obtaining each piece of data.

The sending module 103 is configured to send the at least one piece of data and the at least one acquisition time information to a centralized processing unit.

Optionally, the acquisition time information is represented by at least one of:

an absolute time, a relative time, or a SFN.

Optionally, the acquisition time information is carried in at least one of:

a MAC subheader, a MAC PDU, or a MAC CE.

Optionally, the acquisition time information is carried in the MAC subheader, and the acquisition time information is indicated by a logical channel identifier and/or an enhanced logical channel identifier of the MAC subheader.

Optionally, the at least one piece of data and the at least one acquisition time information are sent during the same transmission or during different transmissions.

Optionally, the centralized processing unit is configured at a base station. The sending module is configured to: send the at least one piece of data and the at least one acquisition time information to the base station.

Optionally, the centralized processing unit is configured at a core network. The sending module is configured to: send the at least one piece of data, the at least one acquisition time information and a first transparent transmission indication to a base station, in which the first transparent transmission indication is configured to indicate the base station to send the at least one piece of data and the at least one acquisition time information to the core network by a transparent transmission; or send the at least one piece of data, the at least one acquisition time information and a first processing request to a base station, in which the first processing request is configured to request the base station to process the at least one piece of data and send the at least one acquisition time information and at least one piece of processed data to the core network.

Optionally, the centralized processing unit is configured at a core network. The sending module is configured to: send the at least one piece of data and the at least one acquisition time information to a base station, in which the at least one piece of data and the at least one acquisition time information are included in first preset information, and the base station processes contents of the first preset information by default, and sends processed first preset information to the core network; or send the at least one piece of data and the at least one acquisition time information to a base station, in which the at least one piece of data and the at least one acquisition time information are included in second preset information, and the base station transparently transmits the second preset information to the core network based on the at least one piece of data and the at least one acquisition time information included in the second preset information.

Optionally, the centralized processing unit is configured at a server. The sending module is configured to: send the at least one piece of data, the at least one acquisition time information, a second transparent transmission indication and a third transparent transmission indication to a base station, in which the second transparent transmission indication is configured to indicate the base station to send the at least one piece of data and the at least one acquisition time information and the third transparent transmission indication to a core network by a transparent transmission, and the third transparent transmission indication is configured to indicate the core network to send the at least one piece of data and the at least one acquisition time information to the server by the transparent transmission; or send the at least one piece of data, the at least one acquisition time information, a second processing request and a fourth transparent transmission indication to a base station, in which the second processing request is configured to request the base station to process the at least one piece of data and send at least one piece of processed data, the at least one acquisition time information and the fourth transparent transmission indication to a core network, and the fourth transparent transmission indication is configured to indicate the core network to send the at least one piece of data after the processing and the at least one acquisition time information to the server by a transparent transmission; or send the at least one piece of data, the at least one acquisition time information, a third processing request and a fifth transparent transmission indication to a base station, in which the fifth transparent transmission indication is configured to indicate the base station to send the at least one piece of data, the at least one acquisition time information and the third processing request to a core network by a transparent transmission, and the third processing request is configured to request the core network to process the at least one piece of data and send at least one piece of processed data and the at least one acquisition time information to the server; or send the at least one piece of data, the at least one acquisition time information, a fourth processing request and a fifth processing request to a base station, in which the fourth processing request is configured to request the base station to process the at least one piece of data and send at least one piece of processed data, the at least one acquisition time information and the fifth processing request to a core network, and the fifth processing request is configured to request the core network to further process the at least one piece of processed data and send at least one piece of further processed data and the at least one acquisition time information to the server.

Optionally, the centralized processing unit is configured at a server. The sending module is configured to: send the at least one piece of data and the at least one acquisition time information to a base station, in which the at least one piece of data and the at least one acquisition time information are included in third preset information, the base station transparently transmits second preset information to a core network based on the at least one piece of data and the at least one acquisition time information included in the third preset information, and the core network transparently transmits the second preset information to the server based on the at least one piece of data and the at least one acquisition time information included in the third preset information; or send the at least one piece of data and the at least one acquisition time information to a base station, in which the at least one piece of data and the at least one acquisition time information are included in fourth preset information, the base station transparently transmits the fourth preset information to a core network based on the at least one piece of data and the at least one acquisition time information included in the fourth preset information, and the core network processes contents of the fourth preset information based on the at least one piece of data and the at least one acquisition time information included in the fourth preset information, and sends processed fourth preset information to the server; or send the at least one piece of data and the at least one acquisition time information to a base station, in which the at least one piece of data and the at least one acquisition time information are included in fifth preset information, the base station processes contents of the fifth preset information based on the at least one piece of data and the at least one acquisition time information included in the fifth preset information and sends processed fifth preset information to a core network, and the core network transparently transmits the processed fifth preset information to the server based on the at least one piece of data and the at least one acquisition time information included in the fifth preset information; or send the at least one piece of data and the at least one acquisition time information to a base station, in which the at least one piece of data and the at least one acquisition time information are included in sixth preset information, the base station processes contents of the sixth preset information based on the at least one piece of data and the at least one acquisition time information included in the sixth preset information and sends processed sixth preset information to a core network, and the core network may further process the sixth preset information based on the at least one piece of data and the at least one acquisition time information included in the sixth preset information and send further processed sixth preset information to the server.

Figure 12:
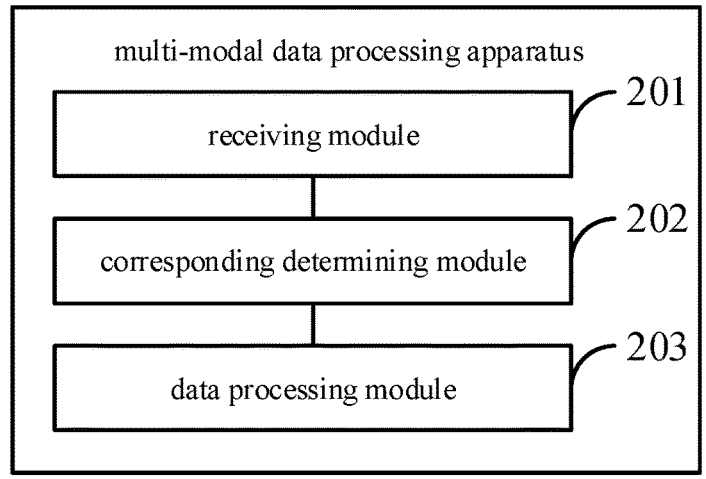
FIG. 12 is a schematic diagram of a multimodal data processing apparatus according to the embodiment of the disclosure.

FIG. 12 is a schematic diagram of a multimodal data processing apparatus according to the embodiment of the disclosure. The apparatus shown in this embodiment may be applied in a centralized processing unit, which may be a physical device or a function integrated on a physical device. The physical device shown may be a base station, a core network, or a server.

As shown in FIG. 12, the apparatus includes: a receiving module 201, a corresponding determining module 202 and a data processing module 203.

The receiving module 201 is configured to receive at least one piece of data and at least one acquisition time information from at least one terminal.

The corresponding determining module 202 is configured to determine data corresponding to each acquisition time information in the at least one acquisition time information from the at least one piece of data.

The data processing module 203 is configured to process the data corresponding to the acquisition time information.

Optionally, the centralized processing unit is set in at least one of:
 a base station, a core network, or a server.

Optionally, the server is a MEC server.

With respect to the apparatus in the above embodiments, the specific manner in which each module performs its operation has been described in detail in the embodiments of the relevant method, and will not be described in detail here.

The apparatus embodiments basically correspond to the method embodiments, the related contents can refer to part of the descriptions of the method embodiments. The above-described apparatus embodiments are merely schematic, the units described above as separate components may or may not be physically separated, and the components displayed as units may or may not be physical units, i.e., the components may be located in one area or may be distributed to multiple network units. Some or all of these modules can be selected according to practical needs to achieve the purpose of the solution of the disclosure. Those skilled in the art can understand and implement the solution without inventive works.

The embodiment of the disclosure also provides an electronic device. The electronic device includes:
 a processor;
 a memory for storing instructions executable by the processor; in which
 the processor is configured to implement the multimodal data transmission method of any one of the above embodiments and/or the multimodal data processing method of any one of the above embodiments.

The embodiment of the disclosure also provides a computer readable storage medium for storing computer programs. When the computer programs are executed by a processor, the multimodal data transmission method of any one of the above embodiments and/or the multimodal data processing method of any one of the above embodiments is implemented.

Figure 13:
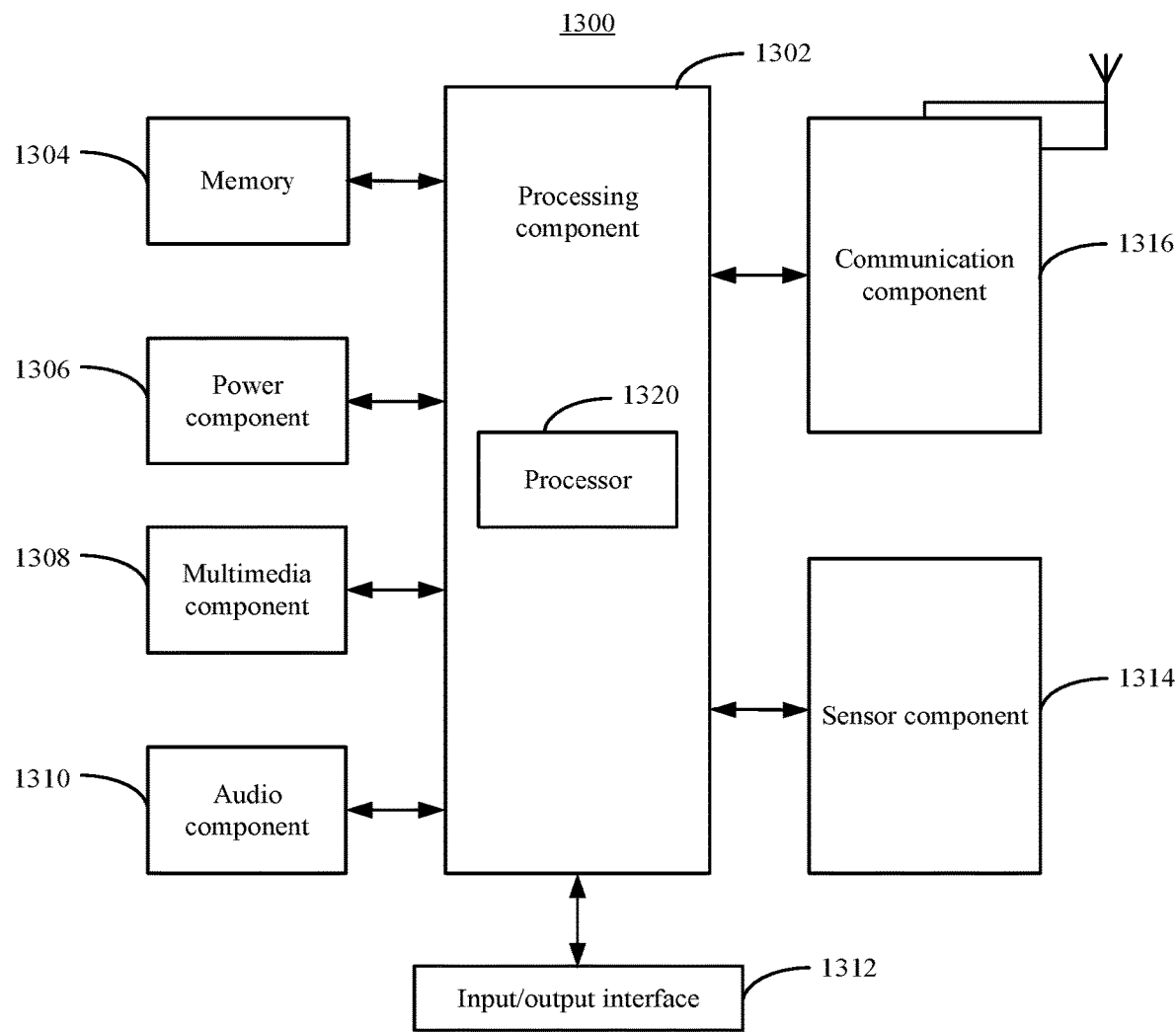
FIG. 13 is a block diagram of a device for transmitting and/or processing multimodal data according to an exemplary embodiment.

FIG. 13 is a block diagram of a device 1300 for transmitting and/or processing multimodal data according to an exemplary embodiment. For example, the device 1300 may be a mobile phone, a computer, a digital broadcasting terminal, a message transceiver device, a game console, a tablet device, a medical device, a fitness device and a personal digital assistant.

As illustrated in FIG. 13, the device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to perform all or part of the steps in the above described method. Moreover, the processing component 1302 may include one or more modules which facilitate the interaction between the processing component 1302 and other components. For example, the processing component 1302 may include a multimedia module to facilitate the interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, pictures, video, etc. The memory 1304 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front-facing camera and/or a rear-facing camera. When the device 1300 is in an operating mode, such as a shooting mode or a video mode, the front-facing camera and the rear-facing camera can receive external multimedia data. Each front-facing camera and rear-facing camera may be a fixed optical lens system or has focal length and optical zoom capability.

The audio component 1310 is configured to output and/or input audio signals. For example, the audio component 1310 includes a microphone (MIC) configured to receive an external audio signal when the device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a Complementary Metal Oxide Semiconductor (CMOS) or Charge-Coupled Device (CCD) image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication standard, such as Wi-Fi, 2G or 3G, 4G LTE, 5G NR or a combination thereof. In an exemplary embodiment, the communication component 1316 receives a broadcast signal or broadcast associated information from an external broadcast management system via a broadcast channel. In an exemplary embodiment, the communication component 1316 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 1300 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In the exemplary embodiments, there is also provided a non-transitory computer readable storage medium including executable instructions, such as the memory 1304, executable by the processor 1320 in the device 1300, for performing the above method. For example, the non-transitory computer-readable storage medium may be a ROM, a Random Access Memory (RAM), a CD-ROM, a magnetic tape, a floppy disc, and an optical data storage device.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

The method and apparatus provided by the embodiments of the disclosure are described in detail above, and specific examples are applied in the disclosure to illustrate the principles and implementation of the disclosure. The above description of the embodiments is intended only to assist in understanding the method of the disclosure and its core ideas. Meanwhile, those skilled in the art may make changes in the specific implementation and the scope of application based on the ideas of this disclosure. In conclusion, the contents of the disclosure should not be considered as limiting the disclosure.

In a first implementation, a multi-modal data transmission method, performed by at least one terminal, includes: obtaining at least one piece of data, wherein each piece of data in the at least one piece of data belongs to a different modality; determining acquisition time information corresponding to obtaining each piece of data; and sending the at least one piece of data and at least one acquisition time information to a centralized processing unit.

In a second implementation based on the first implementation, the acquisition time information is represented by at least one of:
 an absolute time, a relative time, or a system frame number.

In a third implementation based on the first implementation, the acquisition time information is carried in at least one of:
 a media access control (MAC) subheader, a MAC protocol data unit, or a MAC control element.

In a fourth implementation based on the third implementation, the acquisition time information is carried in the MAC subheader, and the acquisition time information is indicated by a logical channel identifier and/or an enhanced logical channel identifier of the MAC subheader.

In a fifth implementation based on the first implementation, the at least one piece of data and the at least one acquisition time information are sent during the same transmission or during different transmissions.

In a sixth implementation based on any of the first to fifth implementations, the centralized processing unit is configured at a base station, and sending the at least one piece of data and the at least one acquisition time information to the centralized processing unit comprises:
 sending the at least one piece of data and the at least one acquisition time information to the base station.

In a seventh implementation based on any of the first to fifth implementations, the centralized processing unit is configured at a core network, and sending the at least one piece of data and the at least one acquisition time information to the centralized processing unit comprises:
 sending the at least one piece of data, the at least one acquisition time information and a first transparent transmission indication to a base station, wherein the first transparent transmission indication is configured to indicate the base station to send the at least one piece of data and the at least one acquisition time information to the core network by a transparent transmission; or
 sending the at least one piece of data, the at least one acquisition time information and a first processing request to a base station, wherein the first processing request is configured to request the base station to process the at least one piece of data and send the at least one acquisition time information and at least one piece of processed data to the core network.

In an eighth implementation based on any of the first to fifth implementations, the centralized processing unit is configured at a core network, and sending the at least one piece of data and the at least one acquisition time information to the centralized processing unit comprises:
 sending the at least one piece of data and the at least one acquisition time information to a base station, wherein the at least one piece of data and the at least one acquisition time information are comprised in first preset information, and the base station processes contents of the first preset information based on the at least one piece of data and the at least one acquisition time information comprised in the first preset information, and sends processed first preset information to the core network; or
 sending the at least one piece of data and the at least one acquisition time information to a base station, wherein the at least one piece of data and the at least one acquisition time information are comprised in second preset information, and the base station transparently transmits the second preset information to the core network based on the at least one piece of data and the at least one acquisition time information comprised in the second preset information.

In a ninth implementation based on any of the first to fifth implementations, the centralized processing unit is configured at a server, and sending the at least one piece of data and the at least one acquisition time information to the centralized processing unit comprises:
 sending the at least one piece of data, the at least one acquisition time information, a second transparent transmission indication and a third transparent transmission indication to a base station, wherein the second transparent transmission indication is configured to indicate the base station to send the at least one piece of data and the at least one acquisition time information and the third transparent transmission indication to a core network by a transparent transmission, and the third transparent transmission indication is configured to indicate the core network to send the at least one piece of data and the at least one acquisition time information to the server by the transparent transmission; or
 sending the at least one piece of data, the at least one acquisition time information, a second processing request and a fourth transparent transmission indication to a base station, wherein the second processing request is configured to request the base station to process the at least one piece of data and send the at least one acquisition time information, the fourth transparent transmission indication and at least one piece of processed data to a core network, and the fourth transparent transmission indication is configured to indicate the core network to send the at least one acquisition time information and the at least one piece of processed data which is processed by the base station, to the server by a transparent transmission; or
 sending the at least one piece of data, the at least one acquisition time information, a third processing request and a fifth transparent transmission indication to a base station, wherein the fifth transparent transmission indication is configured to indicate the base station to send the at least one piece of data, the at least one acquisition time information and the third processing request to a core network by a transparent transmission, and the third processing request is configured to request the core network to process the at least one piece of data and send the at least one acquisition time information and at least one piece of processed data to the server; or sending the at least one piece of data, the at least one acquisition time information, a fourth processing request and a fifth processing request to a base station, wherein the fourth processing request is configured to request the base station to process the at least one piece of data and send the at least one acquisition time information, the fifth processing request and at least one piece of processed data to a core network, and the fifth processing request is configured to request the core network to further process the at least one piece of processed data and send the at least one acquisition time information and at least one piece of further processed data to the server.

In a tenth implementation based on any of the first to fifth implementations, the centralized processing unit is configured at a server, and sending the at least one piece of data and the at least one acquisition time information to the centralized processing unit comprises:

sending the at least one piece of data and the at least one acquisition time information to a base station, wherein the at least one piece of data and the least one acquisition time information are comprised in third preset information, the base station transparently transmits second preset information to a core network based on the at least one piece of data and the at least one acquisition time information comprised in the third preset information, and the core network transparently transmits the second preset information to the server based on the at least one piece of data and the at least one acquisition time information comprised in the third preset information; or sending the at least one piece of data and the at least one acquisition time information to a base station, wherein the at least one piece of data and the at least one acquisition time information are comprised in fourth preset information, the base station transparently transmits the fourth preset information to a core network based on the at least one piece of data and the at least one acquisition time information comprised in the fourth preset information, and the core network processes contents of the fourth preset information based on the at least one piece of data and the at least one acquisition time information comprised in the fourth preset information, and sends processed fourth preset information to the server; or sending the at least one piece of data and the at least one acquisition time information to a base station, wherein the at least one piece of data and the at least one acquisition time information are comprised in fifth preset information, the base station processes contents of the fifth preset information based on the at least one piece of data and the at least one acquisition time information comprised in the fifth preset information and sends processed fifth preset information to a core network, and the core network transparently transmits the processed fifth preset information to the server based on the at least one piece of data and the at least one acquisition time information comprised in the fifth preset information; or sending the at least one piece of data and the at least one acquisition time information to a base station, wherein the at least one piece of data and the at least one acquisition time information are comprised in sixth preset information, the base station processes contents of the sixth preset information based on the at least one piece of data and the at least one acquisition time information comprised in the sixth preset information and sends processed sixth preset information to a core network, and the core network further processes the sixth preset information based on the at least one piece of data and the at least one acquisition time information comprised in the sixth preset information and sends further processed sixth preset information to the server.

In an eleventh implementation, a multi-modal data processing method, performed by a centralized processing unit, includes:

receiving at least one piece of data and at least one acquisition time information from at least one terminal;
determining data corresponding to each acquisition time information in the at least one acquisition time information from the at least one piece of data; and
processing the data corresponding to the acquisition time information.

In a twelfth implementation based on the eleventh implementation, the centralized processing unit is provided in at least one of:

a base station, a core network, or a server.

In a thirteenth implementation based on the twelfth implementation, the server is a mobile edge computing server.

In a fourteenth implementation, a multi-modal information transmission apparatus, applied in at least one terminal, includes:

a data obtaining module, configured to obtain at least one piece of data, wherein each piece of data in the at least one piece of data belongs to a different modality;
a time determining module, configured to determine acquisition time information corresponding to obtaining each piece of data; and
a sending module, configured to send the at least one piece of data and at least one acquisition time information to a centralized processing unit.

In a fifteenth implementation, a multi-modal data processing apparatus, applied in a centralized processing unit, includes:

a receiving module, configured to receive at least one piece of data and at least one acquisition time information from at least one terminal;
a corresponding determining module, configured to determine data corresponding to each acquisition time information in the at least one acquisition time information from the at least one piece of data; and
a data processing module, configured to process the data corresponding to the acquisition time information.

In a sixteenth implementation, an electronic device includes:

a processor;
a memory for storing instructions executable by the processor; wherein
the processor is configured to implement the multimodal data transmission method of any one of the first to tenth implementations and/or the multimodal data processing method of any one of the eleventh to thirteenth implementations.

In a seventh implementation, a computer readable storage medium has computer programs stored thereon, wherein when the computer programs are executed by a processor, the multimodal data transmission method of any of the first to tenth implementations and/or the multimodal data processing method of any one of the eleventh to thirteenth implementations is implemented.

According to the above implementations, the multimodal data and the acquisition time information corresponding to each piece of data are sent to the centralized processing unit, so that the centralized processing unit may obtain the data of each modality at the same moment or during the same time period based on the acquisition time information, which may be used as the inputs of the same processing process, to obtain the accurate processing result.

What is claimed is:

1. A multi-modal data transmission method, performed by at least one terminal, comprising:
   obtaining at least two pieces of data, wherein each piece of data in the at least two pieces of data belongs to a different modality;
   determining acquisition time information corresponding to obtaining each piece of data; and
   sending the at least two pieces of data and at least one acquisition time information to a centralized processing unit,
   wherein the centralized processing unit is configured at a server, and sending the at least two pieces of data and the at least one acquisition time information to the centralized processing unit comprises:
   sending the at least two pieces of data, the at least one acquisition time information, a second transparent transmission indication and a third transparent transmission indication to a first base station, wherein the second transparent transmission indication is configured to indicate the first base station to send the at least two pieces of data and the at least one acquisition time information and the third transparent transmission indication to a core network by a transparent transmission, and the third transparent transmission indication is configured to indicate the core network to send the at least two pieces of data and the at least one acquisition time information to the server by the transparent transmission; or
   sending the at least two pieces of data, the at least one acquisition time information, a second processing request, and a fourth transparent transmission indication to a second base station, wherein the second processing request is configured to request the second base station to process the at least two pieces of data and send the at least one acquisition time information, the fourth transparent transmission indication and at least two pieces of processed data to a core network, and the fourth transparent transmission indication is configured to indicate the core network to send the at least one acquisition time information and the at least two pieces of processed data which is processed by the second base station, to the server by a transparent transmission; or
   sending the at least two pieces of data, the at least one acquisition time information, a third processing request, and a fifth transparent transmission indication to a third base station, wherein the fifth transparent transmission indication is configured to indicate the third base station to send the at least two pieces of data, the at least one acquisition time information and the third processing request to a core network by a transparent transmission, and the third processing request is configured to request the core network to process the at least two pieces of data and send the at least one acquisition time information and at least two pieces of processed data to the server; or
   sending the at least two pieces of data, the at least one acquisition time information, a fourth processing request, and a fifth processing request to a fourth base station, wherein the fourth processing request is configured to request the fourth base station to process the at least two pieces of data and send the at least one acquisition time information, the fifth processing request and at least two pieces of processed data to a core network, and the fifth processing request is configured to request the core network to further process the at least two pieces of processed data and send the at least one acquisition time information and at least two pieces of further processed data to the server.

2. The method of claim 1, wherein the acquisition time information is represented by at least one of:
   an absolute time, a relative time, or a system frame number.

3. The method of claim 1, wherein the acquisition time information is carried in at least one of:
   a media access control (MAC) subheader, a MAC protocol data unit, or a MAC control element.

4. The method of claim 3, wherein the acquisition time information is carried in the MAC subheader, and the acquisition time information is indicated by at least one of a logical channel identifier or an enhanced logical channel identifier of the MAC subheader.

5. The method of claim 1, wherein the at least two pieces of data and the at least one acquisition time information are sent during the same transmission or during different transmissions.

6. The method of claim 1, wherein the centralized processing unit is configured at a base station, and sending the at least two pieces of data and the at least one acquisition time information to the centralized processing unit comprises:
   sending the at least two pieces of data and the at least one acquisition time information to the base station.

7. A multi-modal data processing method, performed by a centralized processing unit, comprising:
   receiving at least two pieces of data and at least one acquisition time information from at least one terminal;
   determining data corresponding to each acquisition time information in the at least one acquisition time information from the at least two pieces of data; and
   processing the data corresponding to the acquisition time information,
   wherein receiving the at least two piece of data and the at least one acquisition time information from at least one terminal comprises:
   receiving the at least two pieces of data and the at least one acquisition time information sent by a core network by a transparent transmission, wherein the core network receives the at least two pieces of data, the at least one acquisition time information and a third transparent transmission indication sent by a first base station by the transparent transmission, the first base station receives the at least two pieces of data, the at least one acquisition time information, a second transparent transmission indication and the third transparent transmission indication from the at least one terminal; wherein the second transparent transmission indication is configured to indicate the first base station to send the at least two piece of data and the at least one acquisition time information and the third transparent transmission indication to a core network by a transparent transmission, and the third transparent transmission indication is configured to indicate the core network to send the at least two pieces of data and the at least one acquisition time information to the server by the transparent transmission; or receiving at least two pieces of processed data and the at least one acquisition time information sent by a core network by a transparent transmission, the core network receives the at least two pieces of processed data, the at least one acquisition time information and a fourth transparent transmission indication sent by a second base station, the second base station receives the at least two piece of data, the at least one acquisition time information, a second processing request, and the fourth transparent transmission indication from the at least one terminal; wherein the second processing request is configured to request the second base station to process the at least two piece of data and send the at least one acquisition time information, and the fourth transparent transmission indication is configured to indicate the core network to send the at least one acquisition time information and the at least two pieces of processed data which is processed by the second base station, to the server by a transparent transmission; or receiving at least two pieces of processed data which is processed by a core network and the at least one acquisition time information sent by the core network, wherein the core network receives the at least two pieces of data, the at least one acquisition time information and a third processing request sent by a third base station by a transparent transmission, the third base station receives the at least two piece of data, the at least one acquisition time information, the third processing request, and a fifth transparent transmission indication from the at least one terminal; wherein the fifth transparent transmission indication is configured to indicate the third base station to send the at least two piece of data, the at least one acquisition time information and the third processing request to a core network by a transparent transmission, and the third processing request is configured to request the core network to process the at least two pieces of data third base station; or receiving at least two pieces of further processed data and the at least one acquisition time information sent by a core network, wherein the core network receives at least two pieces of processed data which is processed by a fourth base station, the at least one acquisition time information and a fifth processing request sent by the fourth base station, the fourth base station receives the at least two piece of data, the at least one acquisition time information, a fourth processing request, and the fifth processing request from the at least one terminal; wherein the fourth processing request is configured to request the fourth base station to process the at least two piece of data and send the at least one acquisition time information, and the fifth processing request is configured to request the core network to further process the at least two pieces of processed data and send the at least one acquisition time information and the at least two pieces of further processed data to the server.

8. The method of claim 7, wherein the centralized processing unit is provided in at least one of:
a base station, a core network, or a server.

9. The method of claim 8, wherein the server comprises a mobile edge computing server.

10. A terminal, comprising:
a processor;
a memory for storing instructions executable by the processor; wherein
the processor is configured to:
obtain at least two pieces of data, wherein each piece of data in the at least two pieces of data belongs to a different modality;
determine acquisition time information corresponding to obtaining each piece of data; and
send the at least two pieces of data and at least one acquisition time information to a centralized processing unit,
wherein the centralized processing unit is configured at a server, and the processor is configured to:
send the at least two pieces of data, the at least one acquisition time information, a second transparent transmission indication and a third transparent transmission indication to a first base station, wherein the second transparent transmission indication is configured to indicate the first base station to send the at least two pieces of data and the at least one acquisition time information and the third transparent transmission indication to a core network by a transparent transmission, and the third transparent transmission indication is configured to indicate the core network to send the at least two pieces of data and the at least one acquisition time information to the server by the transparent transmission; or
send the at least two pieces of data, the at least one acquisition time information, a second processing request, and a fourth transparent transmission indication to a second base station, wherein the second processing request is configured to request the second base station to process the at least two pieces of data and send the at least one acquisition time information, the fourth transparent transmission indication and at least two pieces of processed data to a core network, and the fourth transparent transmission indication is configured to indicate the core network to send the at least one acquisition time information and the at least two pieces of processed data which is processed by the second base station, to the server by a transparent transmission; or
send the at least two pieces of data, the at least one acquisition time information, a third processing request, and a fifth transparent transmission indication to a third base station, wherein the fifth transparent transmission indication is configured to indicate the third base station to send the at least two pieces of data, the at least one acquisition time information and the third processing request to a core network by a transparent transmission, and the third processing request is configured to request the core network to process the at least two pieces of data and send the at least one acquisition time information and at least two pieces of processed data to the server; or
send the at least two pieces of data, the at least one acquisition time information, a fourth processing request, and a fifth processing request to a fourth base station, wherein the fourth processing request is configured to request the fourth base station to process the at least two pieces of data and send the at least one acquisition time information, the fifth processing request and at least two pieces of processed data to a core network, and the fifth processing request is configured to request the core network to further process the at least two pieces of processed data and send the at least one acquisition time information and at least two pieces of further processed data to the server.

11. The terminal of claim 10, wherein the centralized processing unit is configured at a base station, and the processor is configured to:
send the at least two pieces of data and the at least one acquisition time information to the base station.

12. A centralized processing unit, configured to implement the multi-modal data processing method of claim 7, comprising:
a processor; and
a memory, configured to store instructions executable by the processor.

* * * * *